United States Patent
Nuggehalli et al.

(10) Patent No.: US 10,070,461 B2
(45) Date of Patent: Sep. 4, 2018

(54) QOS PROVISIONING FOR LTE-WLAN AGGREGATION

(71) Applicant: MEDIATEK INC., Hsinchu (TW)

(72) Inventors: Pavan Santhana Krishna Nuggehalli, San Carlos, CA (US); Chie-Ming Chou, Taichung (TW); Chia-Chun Hsu, New Taipei (TW)

(73) Assignee: MEDIATEK INC., HsinChu (TW)

( * ) Notice: Subject to any disclaimer, the term of this patent is extended or adjusted under 35 U.S.C. 154(b) by 115 days.

(21) Appl. No.: 15/152,733

(22) Filed: May 12, 2016

(65) Prior Publication Data

US 2016/0338073 A1 Nov. 17, 2016

Related U.S. Application Data

(60) Provisional application No. 62/162,277, filed on May 15, 2015.

(51) Int. Cl.
| | |
|---|---|
| *H04W 48/20* | (2009.01) |
| *H04W 74/08* | (2009.01) |
| *H04W 48/16* | (2009.01) |
| *H04L 12/46* | (2006.01) |
| *H04W 72/08* | (2009.01) |

(Continued)

(52) U.S. Cl.
CPC .......... *H04W 74/08* (2013.01); *H04L 12/4645* (2013.01); *H04W 48/16* (2013.01); *H04W 72/085* (2013.01); *H04W 72/10* (2013.01); *H04L 5/001* (2013.01); *H04W 76/27* (2018.02);

(Continued)

(58) Field of Classification Search
CPC combination set(s) only.
See application file for complete search history.

(56) References Cited

U.S. PATENT DOCUMENTS 8,305,891 B2 * 11/2012 Moonen ............ H04L 29/06027
370/230
9,608,715 B1 3/2017 Fang
(Continued)

FOREIGN PATENT DOCUMENTS

CN 103167562 A 12/2011
CN 102630093 A 5/2012
(Continued)

OTHER PUBLICATIONS

International Search Report and Written Opinion of International Search Authority for PCT/CN2016/081962 dated Jun. 28, 2016 (12 pages).

(Continued)

*Primary Examiner* — Mohamed Kamara
(74) *Attorney, Agent, or Firm* — Imperium Patent Works; Zheng Jin

(57) ABSTRACT

LTE-WLAN aggregation (LWA) at the radio access network level promises significant gain in system capacity and user quality of experience (QoE). In order to support QoS over LWA, there is a need to develop mechanisms to ensure that the access category (AC) classification chosen by a wireless device (AP in the case of downlink, and UE in case of uplink) is consistent with the QoS requirements of the EPS bearer/DRB and/or subscriber profile to which the traffic belongs. The cellular LTE network can provision QoS for both downlink and uplink data flows that are transferred using LWA access.

19 Claims, 7 Drawing Sheets

(51) Int. Cl.
*H04W 72/10* (2009.01)
*H04W 84/12* (2009.01)
*H04W 84/04* (2009.01)
*H04W 88/06* (2009.01)
*H04L 5/00* (2006.01)
*H04W 76/27* (2018.01)

(52) U.S. Cl.
CPC .......... *H04W 84/042* (2013.01); *H04W 84/12* (2013.01); *H04W 88/06* (2013.01)

(56) References Cited

U.S. PATENT DOCUMENTS

| | | | |
|---|---|---|---|
| 2008/0049695 A1* | 2/2008 | Ogura ................. | H04L 47/2491 370/338 |
| 2009/0046655 A1 | 2/2009 | Zhao et al. ................... | 370/331 |
| 2013/0077557 A1* | 3/2013 | Chen ........................ | H04B 7/15 370/315 |
| 2013/0242897 A1 | 9/2013 | Meylan et al. ............... | 370/329 |
| 2013/0315152 A1 | 11/2013 | Ratasuk et al. .............. | 370/329 |
| 2014/0133294 A1 | 5/2014 | Horn et al. ................... | 370/230 |
| 2014/0293793 A1* | 10/2014 | Racz ........................ | H04L 47/20 370/235 |
| 2015/0003435 A1* | 1/2015 | Horn ..................... | H04L 5/0058 370/338 |
| 2015/0049707 A1 | 2/2015 | Vajapeyam et al. ......... | 370/329 |
| 2015/0055516 A1 | 2/2015 | Smadi et al. ................ | 370/280 |
| 2015/0078153 A1 | 3/2015 | Kuo et al. .................... | 370/230 |
| 2015/0103710 A1* | 4/2015 | Lv ..................... | H04W 74/0816 370/311 |
| 2015/0110048 A1 | 4/2015 | Damnjanovic et al. ...... | 370/329 |
| 2015/0334601 A1* | 11/2015 | Gao ...................... | H04W 28/18 370/329 |
| 2015/0373672 A1 | 12/2015 | Forssell ....................... | 370/329 |
| 2016/0044516 A1 | 2/2016 | Hedayat et al. ............. | 370/329 |
| 2016/0128110 A1 | 5/2016 | Sirotkin et al. .............. | 370/329 |
| 2016/0156548 A1 | 6/2016 | Pazhyannur ................. | 370/338 |
| 2016/0183281 A1 | 6/2016 | Yeh et al. .................... | 370/332 |
| 2016/0227440 A1* | 8/2016 | Forssell ................ | H04W 28/08 |
| 2016/0255632 A1 | 9/2016 | Forssell ....................... | 370/329 |
| 2016/0323779 A1 | 11/2016 | Laselva et al. .............. | 370/237 |
| 2017/0055313 A1 | 2/2017 | Sharma et al. .............. | 370/338 |
| 2017/0094701 A1 | 3/2017 | Hong et al. .................. | 370/338 |
| 2017/0099625 A1 | 4/2017 | Li et al. ....................... | 370/338 |
| 2017/0156049 A1 | 6/2017 | Bergström et al. ........... | 455/434 |

FOREIGN PATENT DOCUMENTS

| | | |
|---|---|---|
| CN | 104469856 A | 9/2013 |
| WO | WO2009025899 A1 | 8/2007 |
| WO | WO2014117517 A1 | 1/2013 |

OTHER PUBLICATIONS

International Search Report and Written Opinion of International Search Authority for PCT/CN2016/081943 dated Jul. 28, 2016 (11 pages).

USPTO, The Notice of Allowance for related U.S. Appl. No. 15/152,750 dated Oct. 12, 2017 (10 pages).

* cited by examiner

SOLUTION FOR DOWNLINK LWA PACKET

SOLUTION FOR DOWNLINK LWA PACKET

SOLUTION FOR DOWNLINK LWA PACKET

SOLUTION FOR UPLINK LWA PACKET

SOLUTION FOR UPLINK LWA PACKET

QOS PROVISIONING FOR LTE-WLAN AGGREGATION

CROSS REFERENCE TO RELATED APPLICATIONS

This application claims priority under 35 U.S.C. § 119 from U.S. Provisional Application No. 62/162,277 entitled "QoS Provisioning for LTE-WLAN Aggregation" filed on May 15, 2015, the subject matter of which is incorporated herein by reference.

TECHNICAL FIELD

The disclosed embodiments relate generally to wireless communication, and, more particularly, to QoS provisioning for LTE-WLAN aggregation.

BACKGROUND

Mobile data usage has been increasing at an exponential rate in recent year. A Long-Term Evolution (LTE) system offers high peak data rates, low latency, improved system capacity, and low operating cost resulting from simplified network architecture. In LTE systems, an evolved universal terrestrial radio access network (E-UTRAN) includes a plurality of base stations, such as evolved Node-B's (eNBs) communicating with a plurality of mobile stations referred as user equipment (UEs). However, the continuously rising demand for data traffic requires additional solutions. Interworking between the LTE network and the unlicensed spectrum WLAN provides additional bandwidth to the operators.

The current approaches of interworking of LTE and WLAN suffer from various limitations that hamper the benefits of LTE-WLAN interworking. For example, core network approaches like ANDSF provide rich support for implementing operator policy, providing subscriber specific service, and enabling different kinds of WLAN deployment (e.g., trusted and non-trusted WLANs). However, the core network approaches suffer from significant performance shortcomings. These approaches are unable to react to dynamically varying radio conditions and do not permit aggregation of IP flows over LTE and WLAN access. Some of these limitations have been addressed 3GPP on RAN assisted 3GPP/WLAN interworking (IWK). While the RAN assisted IWK feature promises to improve Quality of Experience (QoE) and network utilization, it is also limited by the inability to aggregate IP flows as well as support of limited traffic granularity at the PDN level.

A potential solution to more fully reap the benefits of LTE-WLAN interworking is to allow LTE-WLAN aggregation (LWA) by integrating the protocol stacks of LTE and WLAN systems. The LTE-WLAN aggregation (LWA) provides data aggregation at the radio access network where an eNB schedules packets to be served on LTE and Wi-Fi radio link. The advantage of this solution is that LWA can provide better control and utilization of resources on both links. LWA can increase the aggregate throughput for all users and improve the total system capacity by better managing the radio resources among users.

In previous work on carrier aggregation and dual connectivity, 3GPP has explored similar integrated architectures for MAC and PDCP layer, respectively. In the case of LTE and WLAN interworking, such integration is made challenging by the fact that these technologies are distinct, and that there is a large deployed base of WLAN access points and access categories (AP/ACs) that need to seamlessly work with any proposed interworking solution. More specifically, how the cellular (LTE) network can configure, manage, and control the QoS levels experienced by data flows that are carried over LWA access needs to be addressed.

SUMMARY

Recent trends in both LTE and WLAN technology development point to the need for enhanced integration to better meet the exploding data needs of mobile customers. LTE-WLAN aggregation (LWA) at the radio access network level promises significant gain in system capacity and user quality of experience (QoE). In order to support QoS over LWA, there is a need to develop mechanisms to ensure that the access category (AC) classification chosen by a wireless device (AP in the case of downlink, and UE in case of uplink) is consistent with the QoS requirements of the EPS bearer/DRB and/or subscriber profile to which the traffic belongs. The cellular LTE network can provision QoS for both downlink and uplink data flows that are transferred using LWA access.

In one embodiment, a method of QoS provision for downlink LWA packet from LTE base station perspective is proposed. An LTE base station configures LTE-WLAN aggregation (LWA) for a user equipment (UE) in a wireless network. The UE is connected with both the base station and an LWA-enabled access point (AP). The base station establishes a data radio bearer (DRB) with the UE. The DRB corresponds to an evolved packet system (EPS) bearer associated with a QoS Class Identifier (QCI). The base station determines access category (AC) information based on the QCI. The base station forwards a data packet carrying the AC information and a protocol data unit (PDU) to the AP. The PDU is to be transmitted to the UE using an AC value determined based on the AC information.

In another embodiment, a method of QoS provision for downlink LWA packet from WLAN AP perspective is proposed. A WLAN AP establishes a connection with a user equipment (UE) in a wireless network. The UE is connected with both a base station and the AP for LTE-WLAN aggregation (LWA). The AP receives a data packet from the base station. The data packet comprises a protocol data unit (PDU) and access category (AC) information. The AP maps the AC information to an AC value based on AC mapping information. The AP performs a channel contention procedure using the AC value and transmitting the PDU to the UE upon winning the channel contention.

In yet another embodiment, a method of QoS provision for uplink LWA packet for UE perspective is proposed. A user equipment (UE) establishes a data radio bearer (DRB) with a base station in a wireless network. The DRB corresponds to an evolved packet system (EPS) bearer associated with a QoS Class Identifier (QCI). The UE receives LTE-WLAN aggregation (LWA) configuration from the base station. The UE is connected with both the base station and an LWA-enabled access point (AP). The UE receives access category (AC) information from the network for determining an AC value based on the AC information. The UE performs a channel contention procedure using the AC value and transmitting a data packet to the AP upon winning the channel contention.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1A:
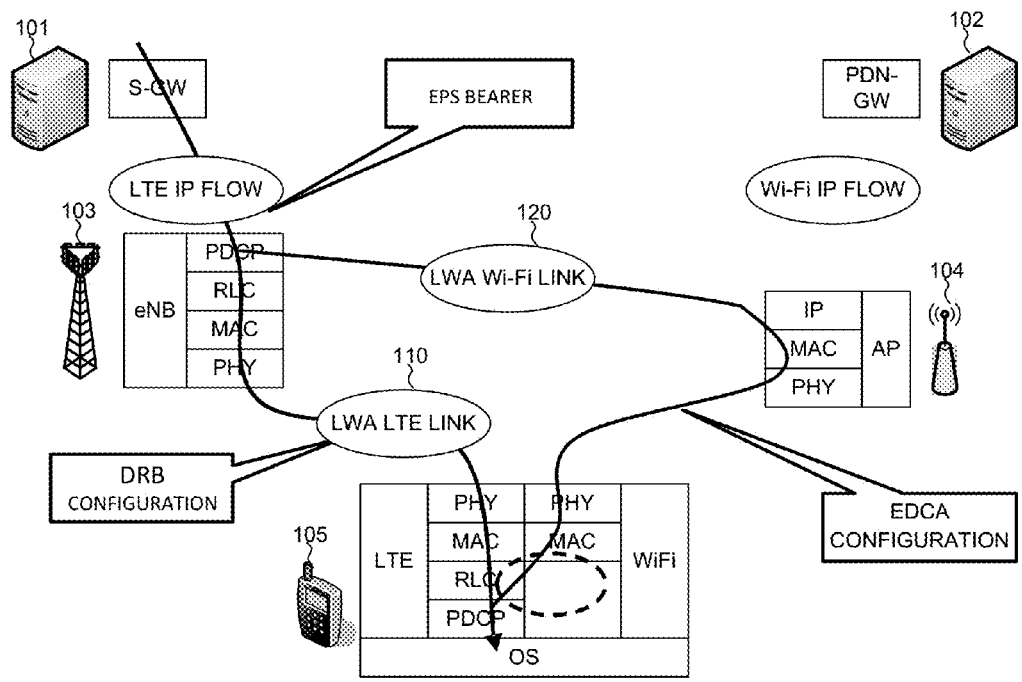
FIG. 1A illustrates a system diagram of a wireless network with LTE-WAN aggregation (LWA) in accordance with embodiments of the current invention.

FIG. 1A illustrates a system diagram of a wireless network 100 with LTE-WLAN aggregation (LWA) in accordance with embodiments of the current invention. Wireless network 100 comprises a serving gateway S-GW 101 connecting to the operator that filters-and-forwards or forwards data packet to LTE base stations, a packet data network gateway PDN-GW 102 connecting to the Internet that performs control plane setup (e.g., QoS mapping) and user plane packet routing, a base station eNB 103 that provides LTE cellular radio access via E-UTRAN, an access point AP 104 that provides Wi-Fi radio access via WLAN, and a user equipment UE 105.

Both LTE and WLAN standards have developed mechanism to provision Quality of Service (QoS). In the case of LTE, guaranteeing QoS is primarily the responsibility of the network, since the network controls how Data Radio Bearers (DRBs) are scheduled in both uplink and downlink directions. In LTE, an evolved packet system (EPS) bearer uniquely identifies traffic flows that receive a common QoS treatment. All traffic mapped to the same EPS bearer receives the same forwarding treatment (e.g., scheduling policy, queue management policy, rate shaping policy, PDCP and RLC configuration etc.). The EPS bearer QoS profile includes the parameters QoS Class Identifier (QCI), Allocation and Retention Priority (ARP), Guaranteed Bit Rate (GBR), and Maximum Bit Rate (MBR).

In the case of WLAN, the IEEE 802.11 has two primary mechanisms for QoS, namely, Enhanced Distributed Channel Access (EDCA) and HCF Controlled Channel Access (HCCA). EDCA is a form of differentiated QoS. Traffic can be classified into four access categories (AC): AC_VI (for video), AC_VO (for voice), AC_BE (for best effort), and AC_BK (for background). The WLAN AP announces the EDCA parameter set (in beacon frames) consisting of several AC specific parameters (TXOPlimit, AISFN, CWmin, and CWmax). Each station (STA) is expected to access the channel based on these parameters and the AC to which the traffic belongs. In contrast, HCCA is a form of integrated QoS that relies on AP scheduling, and utilizes the notion of traffic stream (TS) and traffic specification (TSPEC) element. Since HCCA is not used widely, this disclosure focuses on EDCA.

LTE-WLAN Aggregation (LWA) is a tight integration at radio level, which allows for real-time channel and load-aware radio resource management across LTE and WLAN to provide significant capacity and QoS improvements. When enabling LWA, S1-U is terminated at eNB whereby all IP packets are routed to eNB and perform PDCP layer operations (i.e., ROHC, ciphering) as an LTE PDU. Afterwards, eNB 103 can schedule whether LWA-LTE link 110 or LWA-Wi-Fi link 120 the LTE PDU shall go. LWA borrows the concept of existing dual connectivity (DuCo) to let WLAN network being transport to the core network (CN) for reducing CN load and support "Packet level" offload.

In the example of FIG. 1A, IP packets are carried between the S-GW 101 and the eNB 103 over the S1-U interface. The LWA capable eNB 103 performs legacy PDCP layer operations such as ciphering and header compression (ROHC). In addition, the LWA capable eNB 103 is responsible for aggregating data flows over the LTE and WLAN air-interfaces. For example, the PDCP entity of the LWA capable eNB 103 performs traffic splitting, floor control, and new PDCP header handling for LWA packets received from S-GW 101. In the downlink, eNB 103 can schedule a few PDCP PDUs over LTE access and the remaining over WLAN access. The PDCP entity of the LWA capable UE 105 buffers the PDCP PDUs received over LTE and WLAN air interfaces and performs appropriate functions such as traffic converging and reordering, new PDCP header handling, and legacy PDCP operation. Similar functionality is also required for the uplink. The LTE UE 105 may receive and send packets using multiple DRBs. Since there is a one-to-mapping between EPS bearers and DRBs, the use of multiple DRBs allows the system to provide differentiated QoS.

The WLAN systems use EDCA mechanism to provide differentiated QoS. More specifically, the IEEE 802.11 stations (STAs) classify packets or frames into different access categories (ACs). Channel access for a particular frame is then governed by the EDCA parameters used for the AC to which the frame belongs. In order to support QoS over LWA, there is a need then to develop mechanisms to ensure that the AC classification chosen by the STA (AP in the case of downlink, and UE or non-AP STA in case of uplink) is consistent with the QoS requirements of the EPS bearer/ DRB and/or subscriber profile, to which the traffic belongs. In accordance with one novel aspect, the cellular LTE network can provision QoS for IP data flows that are transferred using LWA access. Solutions for both uplink and downlink LWA packets are proposed to better support QoS with LWA.

Figure 1B:
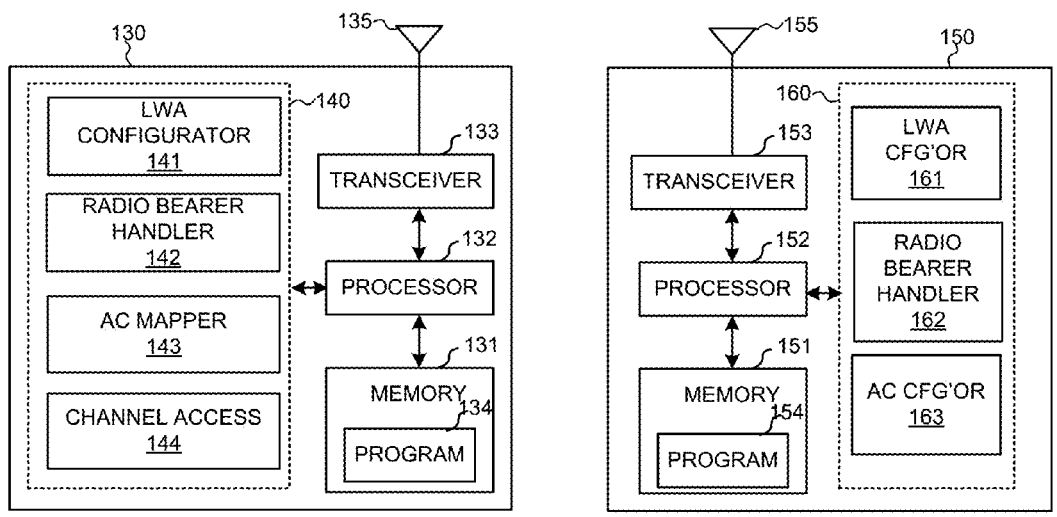
FIG. 1B illustrates simplified block diagram of a UE and a base station in accordance with embodiments of the current invention.

FIG. 1B illustrates simplified block diagrams for UE 130 and eNB 150, respectively. UE 130 has an antenna 135, which transmits and receives radio signals. A RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different modules/circuits to perform features in UE 130. Memory 131 stores program instructions and data 134 to control the operations of UE 130.

UE 130 also includes multiple function modules and circuits that carry out different tasks in accordance with embodiments of the current invention. An LWA QoS controller 140 configures QoS parameters for LWA and performs related functions. An LWA configurator 141 configures LWA configuration received from the network with cooperating WLANs and discovers and selects a WLAN AP to connect. A radio bearer handler 142 establishes DRBs for the UE with corresponding LWA PDCP configuration. An AC mapper 143 maps QoS related AC information to AC values based on AC mapping information. A channel access circuit 144 performs WLAN channel access (e.g., EDCA) using the AC value for transmitting uplink packets.

FIG. 1B also shows an exemplary block diagram for eNB 150. Base station eNB 150 has an antenna 155, which transmits and receives radio signals. A RF transceiver module 153, coupled with the antenna, receives RF signals from antenna 155, converts them to baseband signals and sends them to processor 152. RF transceiver 153 also converts received baseband signals from processor 152, converts them to RF signals, and sends out to antenna 155. Processor 152 processes the received baseband signals and invokes different functional modules/circuits to perform features in eNB 150. Memory 151 stores program instructions and data 154 to control the operations of base station eNB 150.

Similarly, eNB 150 also includes multiple function modules and circuits that carry out different tasks in accordance with embodiments of the current invention. An LWA QoS controller 160 configures QoS parameters for LWA and performs related functions. An LWA configurator 161 provides LWA configuration information with cooperating WLANs and communicates with UE. A radio bearer handler 162 established DRB with UE and handles LWA DRB configuration functions and communicates with UE. An AC configurator 163 determines AC information for WLAN channel access based on the QoS information of corresponding DRB bearers and communicates with UE for uplink packets and selected AP for downlink packets.

Figure 2:
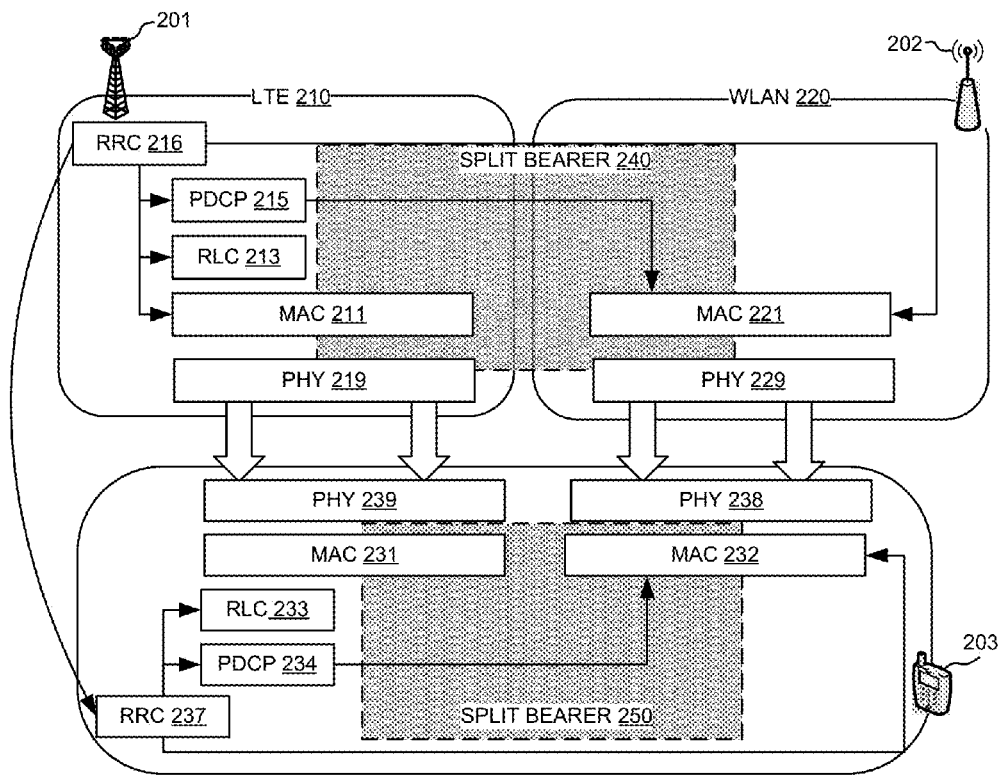
FIG. 2 shows an exemplary diagram of LWA enabled network entities in accordance with embodiments of the current invention.

FIG. 2 shows an exemplary diagram of LWA enabled network entities in accordance with embodiments of the current invention. A LWA-enabled UE 203 is configured with LWA information connecting with an eNB 201 and a WLAN AP 202. eNB 201 is configured with a LTE cell group 210. AP 202 is configured a WLAN cell group 220. eNB 201 has a PHY 219 and a MAC entity 211. A RLC layer entity 213 communicates with MAC 211 and further communicates with a PDCP layer entity 215. PDCP 215, RLC 213, and MAC 211 forms LTE bearer protocol stack that carries data communication for LTE bearers only. Similarly, WLAN 202 has a PHY 229 and MAC 221. MAC 221 forms WLAN bearer protocol stack that carries data communication for SCG bearers only. A split bearer 240 is formed with protocol stacks served from both eNB 201 and WLAN 202. At the radio resource control (RRC) layer, only one RRC layer entity 216 in eNB 201 is configured. RRC 216 controls the protocol stacks in both eNB 201 and WLAN 202 by communicating with a corresponding RRC 237 in UE 203.

UE 203 with LWA-enabled has two MAC entities, MAC entity 231 and MAC entity 232; and two PHY entities, PHY 239 and PHY 238. An RLC layer entity 233 communicates with MAC 231 and further communicates with a PDCP layer entity 234. PDCP 234, RLC 233 and MAC 231 form UE bearer protocol stack that carries data communication for LTE and WLAN bearers. A split bearer 250 is formed for split bearers from both eNB 201 and WLAN 202. At the RRC layer, only one RRC 237 is configured. RRC 237 controls the protocol stacks in corresponding to MAC entities 231 and 232 by communicating with RRC 216 in eNB 201.

Figure 3:
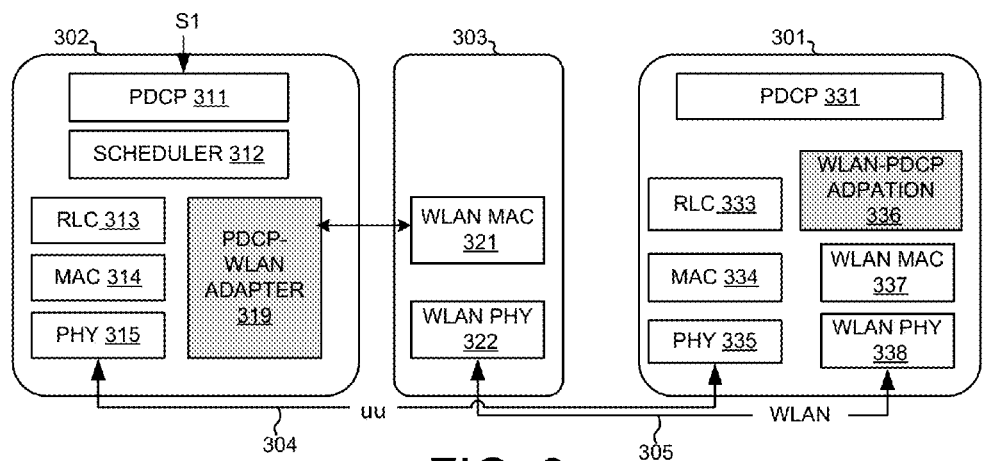
FIG. 3 shows exemplary block diagrams of a UE with LWA-enabled connecting with an eNB and a WLAN AP with data aggregation at radio link level in accordance with embodiments of the current invention.

FIG. 3 shows exemplary block diagrams of a UE 301 with LWA-enabled connecting with an eNB 302 and a WLAN AP 303 with data aggregation at radio link level in accordance with embodiments of the current invention. UE 301 is connected with eNB 302. UE 301 also selects WLAN AP 303 for data aggregation. eNB 302 has a PHY layer 315, a MAC layer 314, a RLC layer 313, a scheduler layer 312 and a PDCP layer 311. To enable the LWA, eNB 302 also has a PDCP-WLAN adapter 319 that aggregates the LTE data traffic through PHY 315 with WLAN data traffic through WLAN AP 303. WLAN AP 303 has a WLAN PHY layer 322 and a WLAN MAC layer 321. WLAN AP 303 connects with the WLAN network and can offload data traffic from the LTE network when UE 301 with LWA enabled is connected with both the LTE eNB 302 and the WLAN AP 303.

UE 301 is LWA-enabled. UE 301 has a PHY layer 335, a MAC layer 334, and a RLC layer 333 that connect with the LTE eNB 302. UE 301 also has a WLAN PHY layer 338 and a WLAN MAC layer 337 that connect with WLAN AP 303. A WLAN-PDCP adaption layer 336 handles the split carrier from the LTE and the WLAN. UE 301 also has a PDCP layer entity 331. UE 301 aggregation its data traffic with eNB 302 and WLAN AP 303. WLAN PHY 322 of WLAN AP 303 connects with WLAN PHY 338 of UE 301 through WLAN interface 305. PHY 315 of LTE eNB 302 connects with PHY 335 of UE 301 through uu interface 304. For LWA, both the LTE data traffic and the WLAN data traffic are aggregated at the PDCP layer entity 331 of UE 301. The PDCP-WLAN adaptation layer 319 at the eNB and a WLAN-PDCP adaptation layer 336 at the UE are proposed to facilitate transmission of LTE PDCP PDUs using WLAN frames in the downlink. Similar adaptation layers are proposed for uplink transmission of PDCP PDUs using WLAN frames.

Solutions for Downlink LWA

Figure 4:
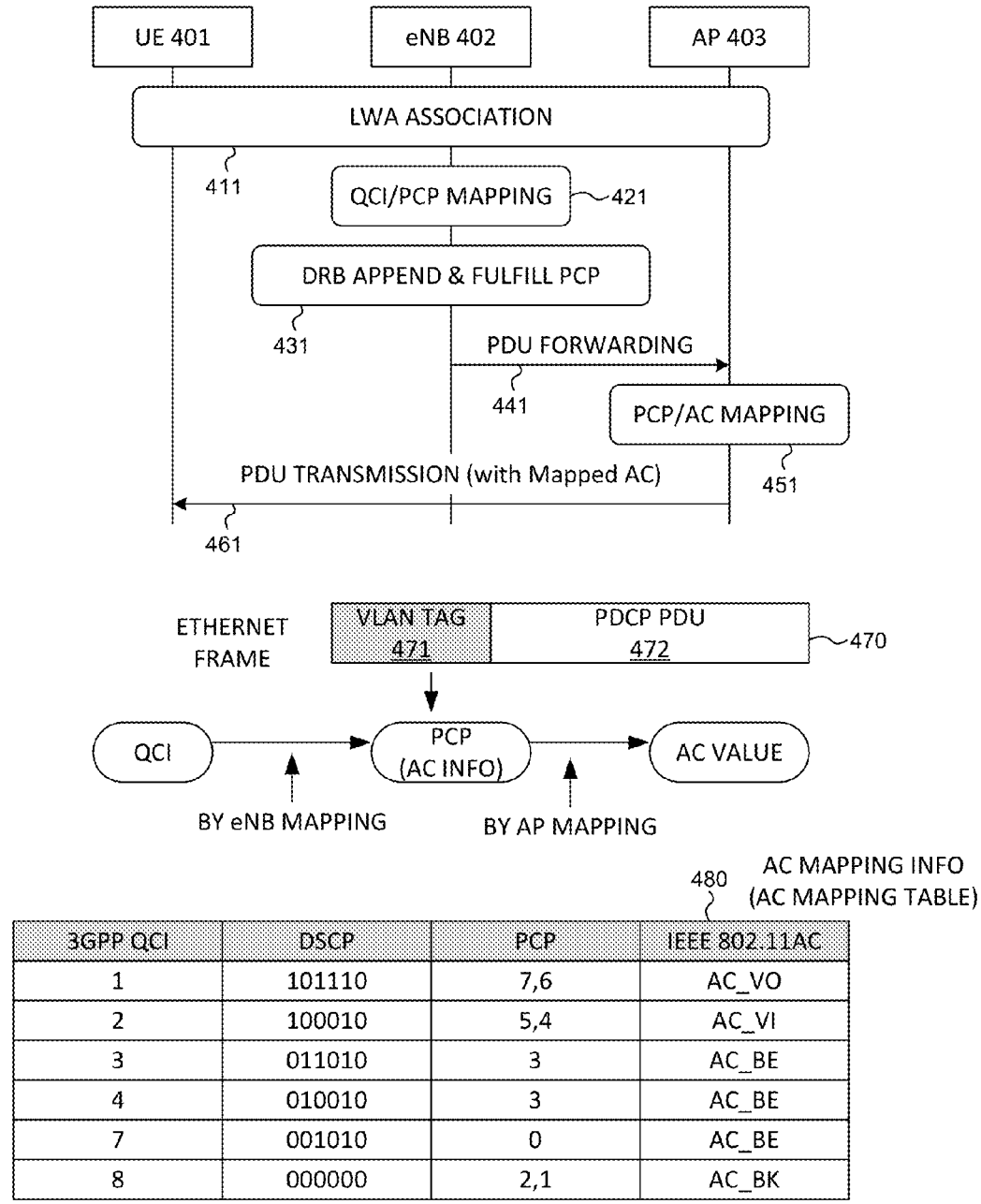
FIG. 4 illustrates a first embodiment of handing downlink LWA packet with QoS provision for LWA in accordance with a novel aspect.

FIG. 4 illustrates a first embodiment of handing downlink LWA packet with QoS provision for LWA in accordance with a novel aspect. In a wireless network, UE 401, LTE base station eNB 402, and Wi-Fi access point AP 403 perform LWA association in step 411. Specifically, eNB 402 provides LWA configuration with cooperating WLANs to UE 401. UE 401 establishes one or more data radio bearer (DRBs) with eNB 402 for data transmission over the cellular interface. In addition, UE 401 also connects to AP 403 for WLAN access. From QoS perspective, each DRB has a one-to-one mapping with an Evolved Packet System (EPS)

bearer, which has an EPS bearer QoS profile that includes a Quality Class Identifier (QCI).

In the embodiment of FIG. 4, eNB 402 and AP 403 are connected to each other via a virtual local area network (VLAN), e.g., an Ethernet connection. Assuming that eNB 402 and AP 403 both support IEEE 802.1Q based VLAN tagging, which includes a VLAN ID and a 3-bit Priority Code Point (PCP). In step 421, eNB 402 performs QCI to PCP mapping, which can be chosen based on a variety of factors including the QCI of the EPS bearer being carried and the user subscription profile. For example, an AC mapping table 480 can be used to map the QCI to PCP. In step 431, eNB 402 modifies the VLAN tag for each Ethernet frame carrying an LTE PDCP PDU by using the desired 3-bit PCP field. For example, Ethernet frame 470 contains a VLAN tag 471 and a PDCP PDU 472. In step 441, eNB 402 forwards the Ethernet frame 470 carrying the PDCP PDU 472 and the PCP value contained in VLAN tag 471 to AP 403. The PCP value is also referred to as the AC information, because it is to be mapped to an AC value by AP 403.

In step 451, the WLAN AP 403 determines the appropriate IEEE 802.11e AC value that corresponds to the PCP value in the received Ethernet frame by performing PCP to AC mapping. In the example of FIG. 4, the WLAN AP 403 is provisioned with AC mapping information, e.g., the AC mapping table 480. AP 403 uses the mapping table 480 to determine the AC value from the PCP value. Such AC mapping information can be provided in several ways. For example, an O&M entity could dynamically provide the AC mapping information to be used, or the eNB could provide the AC mapping information to the AP or AP controller over a control interface, or the WLAN AP could be statically configured with the mapping table.

Figure 5:
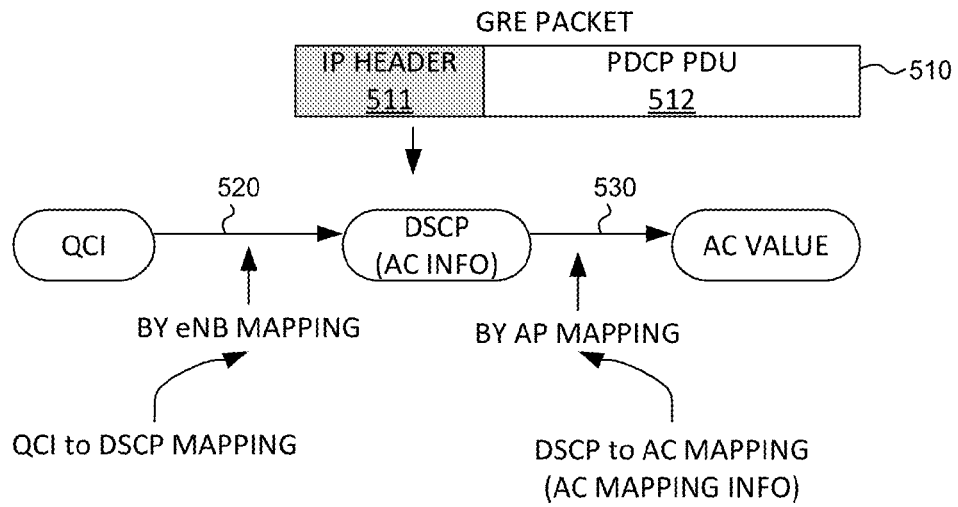
FIG. 5 illustrates a second embodiment of handing downlink LWA packet with QoS provision for LWA in accordance with a novel aspect.

FIG. 5 illustrates a second embodiment of handing downlink LWA packet with QoS provision for LWA in accordance with a novel aspect. In a wireless network, a UE, an LTE base station eNB, and a Wi-Fi access point AP perform LWA association. Specifically, the eNB provides LWA configuration with cooperating WLANs to the UE. The UE establishes one or more data radio bearer (DRBs) with the eNB for data transmission over the cellular interface. In addition, the UE also connects to the AP for WLAN access. From QoS perspective, each DRB has a one-to-one mapping with an Evolved Packet System (EPS) bearer, which has an EPS bearer QoS profile that includes a Quality Class Identifier (QCI).

The embodiment of FIG. 5 is similar to the embodiment of FIG. 4. However, in the embodiment of FIG. 5, the eNB and the AP may not be connected to each other via a VLAN Ethernet connection. Instead, the eNB provides a mapping table that can be used by the AP to choose the appropriate IEEE 802.11e AC value when LTE PDCP PDUs are encapsulated as GRE packets. For example, the eNB first performs QCI to Differentiated Service Code Point (DSCP) mapping in step 520, which can be chosen based on a variety of factors including the QCI of the EPS bearer being carried and the user subscription profile. The eNB then modifies the outer IP header for each GRE packet encapsulating an LTE PDCP PDU by using the desired 6-bit DSCP field. AS depicted in FIG. 5, GRE packet 510 contains an outer IP header 511 and a PDCP PDU 512. The eNB then forwards the GRE packet carrying the PDCP PDU 512 as well as the 6-bit DSCP value contained in the outer IP header 511 to the AP. The DSCP value is also referred to as the AC information, because it is to be mapped to an AC value by the AP.

The WLAN AP then determines the appropriate IEEE 802.11e AC value that corresponds to the DSCP value in the received GRE packet by performing DSCP to AC mapping. In the example of FIG. 5, the WLAN AP is provisioned with AC mapping information, e.g., according to the AC mapping table 480 in FIG. 4. The AP uses the mapping table 480 to determine the AC value from the DSCP value (step 530). Such a mapping can be provided in several ways. For example, an O&M entity could dynamically provide the mapping to be used, or the eNB could provide the mapping information to the AP or AP controller over a control interface, or the WLAN AP could be statically configured with the mapping table.

The WLAN AP can also be provisioned with a set of packet filters and associated rules. The packet filter can include a variety of packet information elements including source IP address, destination IP address, source MAC address, destination MAC address, and Ether Type etc. All downstream packets received by the WLAN AP that match a specified packet filter are then classified into an IEEE 802.11e AC based on the rule associated with the matching filter. The filters and rules can be statically configured at the WLAN AP or be dynamically configured using an O&M entity (including the eNB when a control interface (e.g., X2) exists between the eNB and AP).

In another solution, the WLAN AP always applies a default AC value for LTE PDCP PDUs. The default AC value can be statically configured at the WLAN AP or be dynamically configured using an O&M entity (including the eNB when a control interface (e.g., X2) exists between the eNB and the AP).

Figure 6:
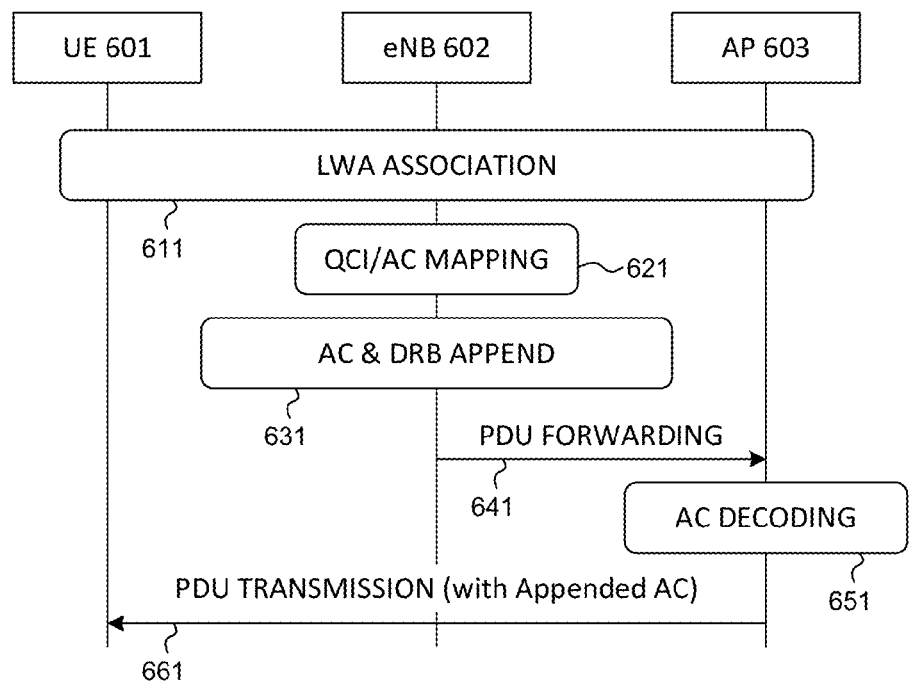
FIG. 6 illustrates another embodiment of handing downlink LWA packet with QoS provision for LWA in accordance with a novel aspect

FIG. 6 illustrates another embodiment of handing downlink LWA packet with QoS provision for LWA in accordance with a novel aspect. In a wireless network, UE 601, LTE base station eNB 602, and Wi-Fi access point AP 603 perform LWA association in step 611. Specifically, eNB 602 provides LWA configuration with cooperating WLANs to UE 601. UE 601 establishes one or more data radio bearer (DRBs) with eNB 602 for data transmission over the cellular interface. In addition, UE 601 also connects to AP 603 for WLAN access. From QoS perspective, each DRB has a one-to-one mapping with an Evolved Packet System (EPS) bearer, which has an EPS bearer QoS profile that includes a Quality Class Identifier (QCI).

In the embodiment of FIG. 6, the eNB appends a special header to the PDCP PDU to identify the QoS class of the corresponding PDCP PDU. There are several ways the eNB may denote the QoS class. For example, the eNB may use IEEE 802.1p class of service (CoS) priority levels (requiring 3 bits) or IEEE 802.11e ACs directly (requiring 2 bits). In step 621, eNB 602 maps QCI to AC information (e.g., QCI is mapped to either a 3-bit CoS or a 2-bit AC value) (e.g., according to AC mapping table 480 in FIG. 4). In step 631, eNB 602 appends a special LWA header for each LTE PDCP PDU by using the mapped AC information. In step 641, eNB 602 forwards the PDCP PDU with the special LWA header to AP 603.

The WLAN AP 603, on receipt of a packet carrying a special LWA header, will then decode the AC (either by mapping from the IEEE 802.1p CoS or directly from the AC value) in step 651. In step 652, AP 603 sends the packet to UE 601 over the WLAN air-interface by performing an EDCA channel access using the decoded AC.

We note that this solution may also affect non-3GPP technology. The AP must be able to distinguish packets received from the eNB from packets received from other sources (e.g. servers). Additionally, the WLAN AP may retain the LWA header when transmitting the 802.11 frame to the WLAN modem in the UE.

Solutions for Uplink LWA

In the uplink, QoS provisioned is enabled by controlling how the UE decides to classify PDCP PDUs sent on the WLAN interface on a per DRB basis. In other words, for each PDCP PDU sent over the WLAN interface, the UE selects the AC value based on the DRB to which the PDCP PDU belongs.

Figure 7:
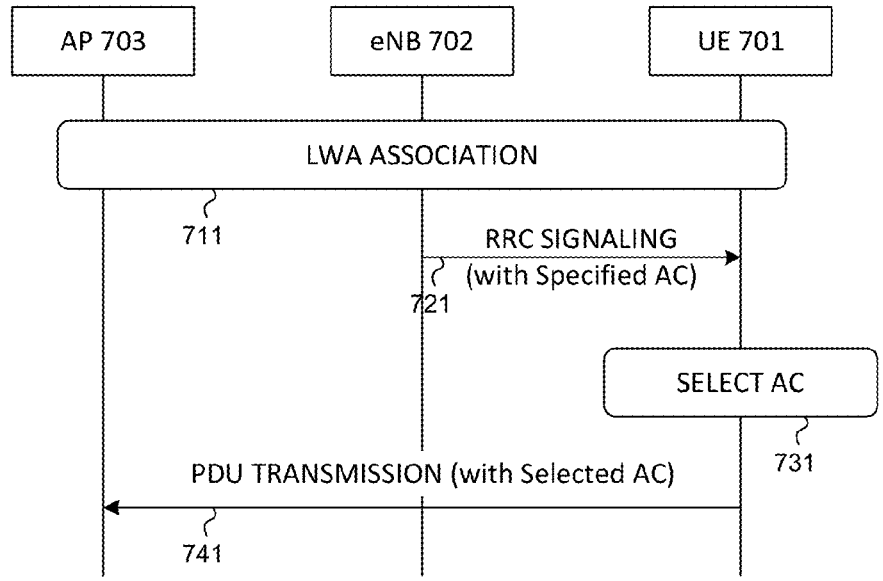
FIG. 7 illustrates a first embodiment of handing uplink LWA packet with QoS provision for LWA in accordance with a novel aspect.

FIG. 7 illustrates a first embodiment of handing uplink LWA packet with QoS provision for LWA in accordance with a novel aspect. In a wireless network, UE 701, LTE base station eNB 702, and Wi-Fi access point AP 703 perform LWA association in step 711. Specifically, eNB 702 provides LWA configuration with cooperating WLANs to UE 701. UE 701 establishes one or more data radio bearer (DRBs) with eNB 702 for data transmission over the cellular interface. In addition, UE 701 also connects to AP 703 for WLAN access. From QoS perspective, each DRB has a one-to-one mapping with an Evolved Packet System (EPS) bearer, which has an EPS bearer QoS profile that includes a Quality Class Identifier (QCI).

In this embodiment, the eNB specifies the IEEE 802.11e AC value to use for each (uplink) DRB configured for LWA access. In step 721, eNB 702 sends the specified AC value to UE 701 via RRC signaling. In step 731, UE 701 selects the AC value specified by the eNB. In step 741, UE 701 sends an uplink PDCP PDU to AP 703 over the WLAN interface by performing an EDCA channel access using the selected AC. This solution provides the greatest flexibility in the sense that QoS policy can be managed on per user and per DRB basis.

Figure 8:
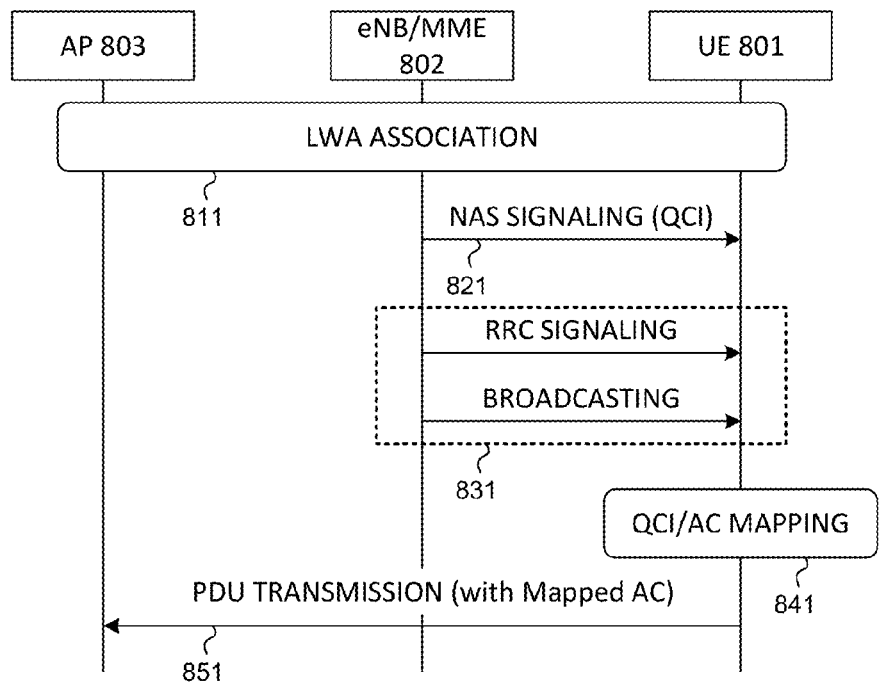
FIG. 8 illustrates a second embodiment of handing uplink LWA packet with QoS provision for LWA in accordance with a novel aspect.

FIG. 8 illustrates a second embodiment of handing uplink LWA packet with QoS provision for LWA in accordance with a novel aspect. In a wireless network, UE 801, LTE base station eNB 802, and Wi-Fi access point AP 803 perform LWA association in step 811. Specifically, eNB 802 provides LWA configuration with cooperating WLANs to UE 801. UE 801 establishes one or more data radio bearer (DRBs) with eNB 802 for data transmission over the cellular interface. In addition, UE 801 also connects to AP 803 for WLAN access. From QoS perspective, each DRB has a one-to-one mapping with an Evolved Packet System (EPS) bearer, which has an EPS bearer QoS profile that includes a Quality Class Identifier (QCI).

In this embodiment, the UE relies on the QCI value of the DRB to determine the IEEE 802.11e AC value to use. For each EPS bearer, QCI value is provided during bearer setup in non-access stratum (NAS) messaging. In addition, it is also possible to modify the QCI value associated with an EPS bearer (e.g., using the NAS layer EPS modification process). For example, in step 821, a mobility management entity MME 802 sends the QCI or modified QCI to UE 801 via NAS signaling. The UE can then use a mapping table to convert the LTE QCI to IEEE 802.11e AC value. The mapping mechanism can be achieved in a number of ways. In one example, the 3GPP specification can provide a static mapping between QCI and IEEE 802.11e AC value for the UEs to use (e.g., table 480). In another example, the eNB can announce the mapping via dedicated or broadcast signaling (e.g., step 831). In yet another example, 3GPP NAS messaging may be enhanced to support mapping between QCI and AC value (not shown). In step 841, UE 801 performs QCI to AC mapping based on the configured mapping mechanism. In step 851, UE 801 sends the PDCP PDU to AP 803 over the WLAN interface by performing an EDCA channel access using the mapped AC value.

In another solution, Access Network Discovery and Selection Function (ANDSF) can be enhanced to support uplink QoS provisioning. ANDSF traffic routing policies (ISRP and IARP) can contain rules for Multi-Access PDN Connectivity (MAPCON), IP Flow Mobility (IFOM), and Non-Seamless WLAN Offload (NSWO). It is possible to treat LWA access as 3GPP access. In this case, the ANDSF policies can indicate which IEEE 802.11e AC values to use for those IP flows that are routed over 3GPP access.

Figure 9:
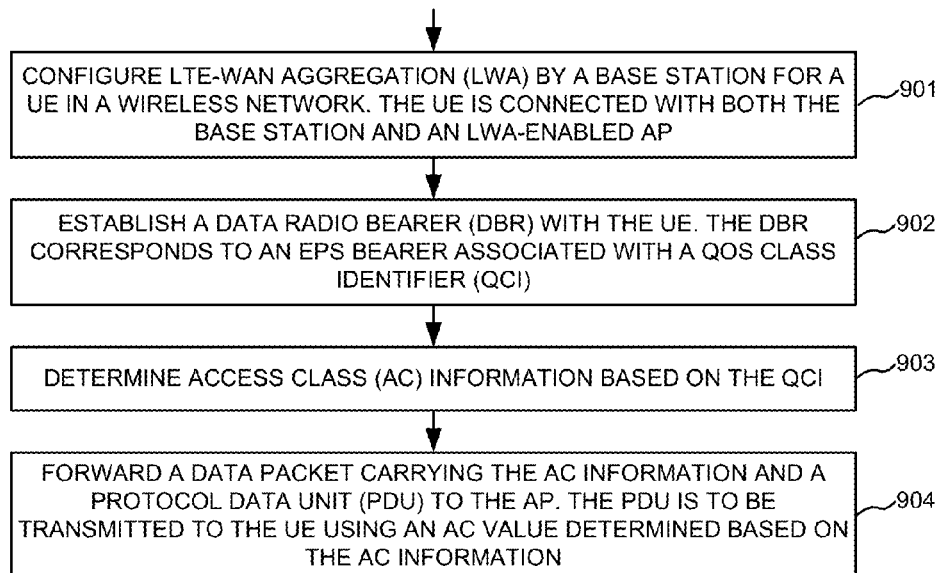
FIG. 9 is an exemplary flow chart of a method of QoS provision for downlink LWA packet from LTE base station perspective in accordance with embodiments of the current invention.

FIG. 9 is an exemplary flow chart of a method of QoS provision for downlink LWA packet from LTE base station perspective in accordance with embodiments of the current invention. In step 901, an LTE base station configures LTE-WLAN aggregation (LWA) for a user equipment (UE) in a wireless network. The UE is connected with both the base station and an LWA-enabled access point (AP). In step 902, the base station establishes a data radio bearer (DRB) with the UE. The DRB corresponds to an evolved packet system (EPS) bearer associated with a QoS Class Identifier (QCI). In step 903, the base station determines access category (AC) information based on the QCI. In step 904, the base station forwards a data packet carrying the AC information and a protocol data unit (PDU) to the AP. The PDU is to be transmitted to the UE using an AC value determined based on the AC information.

Figure 10:
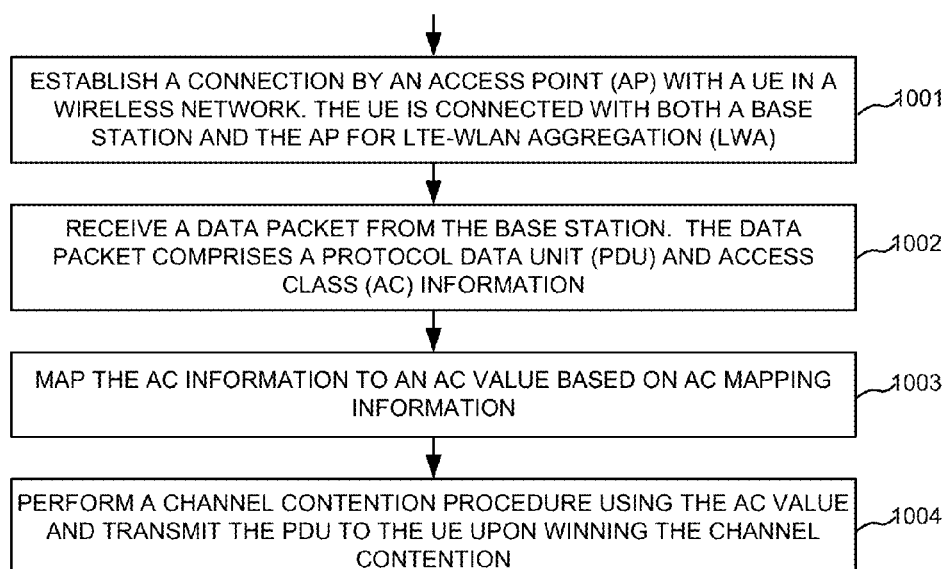
FIG. 10 is an exemplary flow chart of a method of QoS provision for downlink LWA packet from WLAN AP perspective in accordance with embodiments of the current invention.

FIG. 10 is an exemplary flow chart of a method of QoS provision for downlink LWA packet from WLAN AP perspective in accordance with embodiments of the current invention. In step 1001, a WLAN AP establishes a connection with a user equipment (UE) in a wireless network. The UE is connected with both a base station and the AP for LTE-WLAN aggregation (LWA). In step 1002, the AP receives a data packet from the base station. The data packet comprises a protocol data unit (PDU) and access category (AC) information. In step 1003, the AP maps the AC information to an AC value based on AC mapping information. In step 1004, the AP performs a channel contention procedure using the AC value and transmitting the PDU to the UE upon winning the channel contention.

Figure 11:
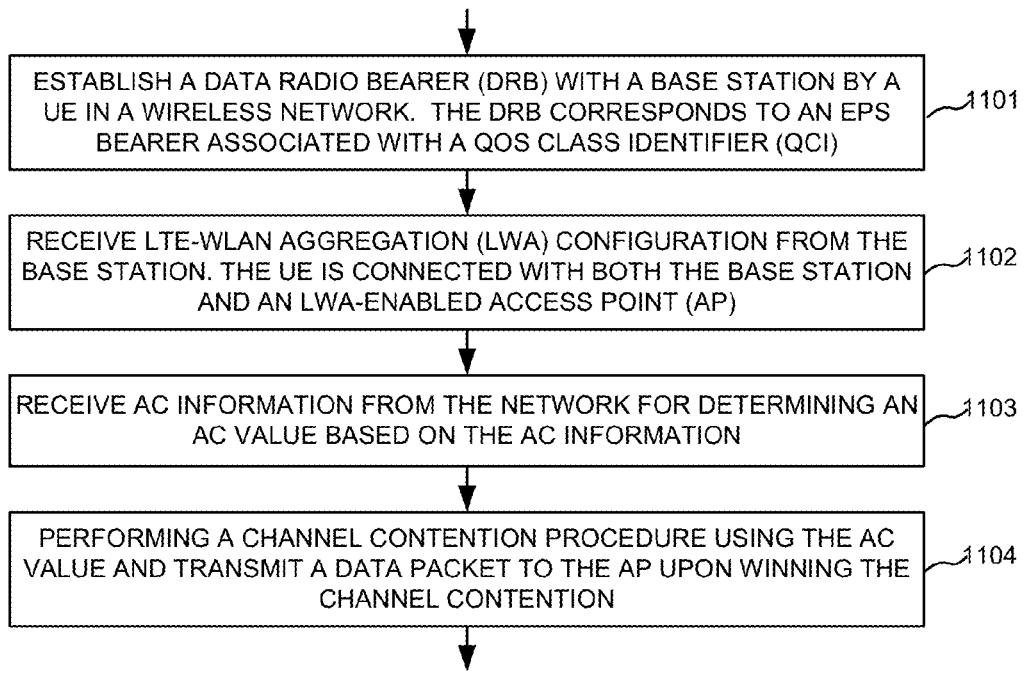
FIG. 11 is an exemplary flow chart of a method of QoS provision for uplink LWA packet for UE perspective in accordance with embodiments of the current invention.

FIG. 11 is an exemplary flow chart of a method of QoS provision for uplink LWA packet for UE perspective in accordance with embodiments of the current invention. In step 1101, a user equipment (UE) establishes a data radio bearer (DRB) with a base station in a wireless network. The DRB corresponds to an evolved packet system (EPS) bearer associated with a QoS Class Identifier (QCI). In step 1102, the UE receives LTE-WLAN aggregation (LWA) configuration from the base station. The UE is connected with both the base station and an LWA-enabled access point (AP). In step 1103, the UE receives access category (AC) information from the network for determining an AC value based on the AC information. In step 1104, the UE performs a channel contention procedure using the AC value and transmitting a data packet to the AP upon winning the channel contention.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method comprising:
  configuring LTE-WLAN aggregation (LWA) by a base station for a user equipment (UE) in a wireless network, wherein the UE is connected with both the base station and an LWA-enabled access point (AP);

establishing a data radio bearer (DRB) with the UE, wherein the DRB corresponds to an evolved packet system (EPS) bearer associated with a QoS Class Identifier (QCI);

determining access category (AC) information based on the QCI; and forwarding a data packet carrying the AC information and a protocol data unit (PDU) from the base station to the UE via the LWA-enabled AP over an LWA Wi-Fi link, wherein the PDU is to be transmitted to the UE using an AC value determined based on the AC information, and wherein the base station appends a special LWA header comprising the AC information to the data packet.

2. The method of claim 1, wherein the base station and the AP are connected via a virtual local area network (VLAN), and wherein the data packet is an Ethernet frame having a VLAN tag containing the AC information.

3. The method of claim 2, wherein the AC information comprises a Priority Code Point (PCP) field contained in the VLAN tag.

4. The method of claim 1, wherein the PDU is encapsulated in a GRE packet, and wherein the AC information comprises a Differentiated Services Code Point (DSCP) field in the GRE packet header.

5. The method of claim 1, wherein the base station determines the AC information by mapping from the QCI and UE subscription information.

6. The method of claim 1, wherein the base station provides AC mapping information to the AP such that the AC information is mapped to the AC value based on the AC mapping information.

7. A base station, comprising:
an LTE-WLAN aggregation (LWA) configurator that provides LWA configuration for a user equipment (UE) in a wireless network, wherein the UE is connected with both the base station and an LWA-enabled access point (AP);

a radio bearer handler that establishes a data radio bearer (DRB) with the UE, wherein the DRB corresponds to an evolved packet system (EPS) bearer associated with a QoS Class Identifier (QCI);

an access category (AC) configurator that determines AC information based on the QCI; and a transmitter that transmits a data packet carrying the AC information and a protocol data unit (PDU) to the to the UE via the LWA-enabled AP over an LWA Wi-Fi link, wherein the PDU is to be transmitted to the UE using an AC value determined based on the AC information, and wherein the base station appends a special LWA header comprising the AC information to the data packet.

8. The base station of claim 7, wherein the base station and the AP are connected via a virtual local area network (VLAN), and wherein the data packet is an Ethernet frame having a VLAN tag containing the AC information.

9. The base station of claim 8, wherein the AC information comprises a Priority Code Point (PCP) field contained in the VLAN tag.

10. The base station of claim 7, wherein the PDU is encapsulated in a GRE packet, and wherein the AC information comprises a Differentiated Services Code Point (DSCP) field in the GRE packet header.

11. The base station of claim 7, wherein the base station determines the AC information by mapping from the QCI and UE subscription information.

12. The base station of claim 7, wherein the base station provides AC mapping information to the AP such that the AC information is mapped to the AC value based on the AC mapping information.

13. A method comprising:
establishing a connection by an access point (AP) with a user equipment (UE) in a wireless network, wherein the UE is connected with both a base station and the AP for LTE-WLAN aggregation (LWA);

receiving a data packet from the base station over an LWA Wi-Fi link, wherein the data packet comprises a protocol data unit (PDU) and access category (AC) information, and wherein the data packet has a special LWA header comprising the AC information;

mapping the AC information to an AC value based on AC mapping information; and performing a channel contention procedure using the AC value and transmitting the PDU to the UE upon winning the channel contention.

14. The method of claim 13, wherein the data packet is an Ethernet frame, and wherein the AC information comprises a Priority Code Point (PCP) field contained in a VLAN tag of the Ethernet frame.

15. The method of claim 13, wherein the data packet is a GRE packet, and wherein the AC information comprises a Differentiated Services Code Point (DSCP) field in the GRE packet header.

16. The method of claim 13, wherein the AP is provisioned with a set of packet filters and associated rules for mapping the AC information.

17. The method of claim 13, wherein the AP applies a default AC value for LTE PDUs.

18. The method of claim 13, wherein the data packet contains a special LWA header that carries the AC information.

19. The method of claim 13, wherein the AP receives the AC mapping information from the base station.

* * * * *